US010530274B2

United States Patent
Mueller et al.

(10) Patent No.: US 10,530,274 B2
(45) Date of Patent: Jan. 7, 2020

(54) HYBRID CLOCKING METHOD FOR SINGLE-PHASE TRANSFORMER-FREE NETWORK INVERTERS

(71) Applicant: SMA Solar Technology AG, Niestetal (DE)

(72) Inventors: Burkard Mueller, Kassel (DE); Klaus Rigbers, Kassel (DE); Wilfried Vogt, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 16/294,065

(22) Filed: Mar. 6, 2019

(65) Prior Publication Data

US 2019/0207534 A1 Jul. 4, 2019

Related U.S. Application Data

(63) Continuation of application No. PCT/EP2017/072394, filed on Sep. 6, 2017.

(30) Foreign Application Priority Data

Sep. 6, 2016 (DE) .................. 10 2016 116 630

(51) Int. Cl.
*H02M 7/5387* (2007.01)
*H02M 1/32* (2007.01)
*H02J 3/38* (2006.01)

(52) U.S. Cl.
CPC ......... *H02M 7/53871* (2013.01); *H02J 3/383* (2013.01)

(58) Field of Classification Search
CPC ........ H02M 7/525; H02M 7/527; H02M 7/53; H02M 7/537; H02M 7/5387;
(Continued)

(56) References Cited

U.S. PATENT DOCUMENTS

| 8,547,716 B2 * | 10/2013 | Yoneda ................. H01M 10/02 323/906 |
| 2005/0139259 A1 * | 6/2005 | Steigerwald ............. H02J 7/35 136/244 |

(Continued)

FOREIGN PATENT DOCUMENTS

| CN | 104300811 A | 1/2015 |
| DE | 102011116593 B4 | 11/2014 |

OTHER PUBLICATIONS

International Search Report dated Nov. 21, 2017 in connection with International Application PCT/EP2017/072394.

(Continued)

*Primary Examiner* — Gary L Laxton
(74) *Attorney, Agent, or Firm* — Eschweiler & Potashnik, LLC

(57) ABSTRACT

A method for operating a transformerless inverter includes operating first and second half-bridges of the inverter using a unipolar clocking method as a first clocking method, determining a value of a grid-frequency stray current at the DC terminals of the inverter during the unipolar clocking method, and when a limit value is exceeded by the stray current value, operating the first and second half-bridges of the inverter using a stray-current-reducing clocking method as a second clocking method in which the first half-bridge provides an AC voltage at the first AC output, wherein an amplitude of the AC voltage is less than 50% of the amplitude of a voltage amplitude of the grid, and the second half-bridge provides a difference voltage between the grid voltage and the voltage provided by the first half-bridge at the first AC output.

16 Claims, 4 Drawing Sheets

(58) Field of Classification Search
CPC ............ H02M 7/53871; H02M 7/539; H02M 7/5395; H02M 7/5388; H02M 1/32; H02M 2001/325
See application file for complete search history.

(56) References Cited

U.S. PATENT DOCUMENTS

| | | |
|---|---|---|
| 2013/0099571 A1 | 4/2013 | Bremicker et al. |
| 2016/0268925 A1* | 9/2016 | Hu .................. H02M 7/487 |
| 2017/0346389 A1* | 11/2017 | Lung ................ H02J 3/385 |

OTHER PUBLICATIONS

Eugino Gubia et al; EMI Filter Inductor Size for Transformerless PV Systems Based on the Full Bridge Structure; 2010 14th International, IEEE, Piscataway, NJ; Sep. 6, 2010; pp. S9-1.

Tang Yi et al; "Highly Reliable Transformerless Photovoltaic Inverters With Leakage Current and Pulsating Power Elimination"; vol. 63, No. 2; Piscataway, NJ; Feb. 1, 2016; pp. 1016-1026.

Wi Tsai-Fu et al; "Combined Unipolar and Bipolar PWM for Current Distortion Improvement During Power Compensation"; vol. 29, No. 4; Apr. 1, 2014; pp. 1702-1709.

Fang Chen et al; "Active Control of Low Frequency Common Mode Voltage to Connect AC Utility and 38V DC Grid"; 2016, pp. 177-184.

Deepak Kumar et al.; "Comparative Assessment of Leakage Current in a Photovoltaic Grid Connected Single Phase Transformerless Inverter System"; 2014, pp. 1-7.

* cited by examiner

HYBRID CLOCKING METHOD FOR SINGLE-PHASE TRANSFORMER-FREE NETWORK INVERTERS

CROSS REFERENCE TO RELATED APPLICATIONS

This application is a continuation of International Patent Application number PCT/EP2017/072394, filed on Sep. 6, 2017, which claims priority to German Patent Application number 102016116630.8, filed on Sep. 6, 2016, and is hereby incorporated by reference in its entirety.

FIELD

The disclosure relates to a method for operating an inverter and to an inverter.

BACKGROUND

Inverters are used in photovoltaic (PV) systems to convert power provided by solar modules as direct current to alternating current in order to be able to feed said power into a grid. The power generated jointly by a multiplicity of solar modules is typically converted to AC voltage by way of an inverter, wherein transformerless inverters permit particularly efficient conversion. In particular, transformerless inverters that feed in a single-phase manner and have a full-bridge topology generally do not permit grounding of the solar modules during operation because the potential reference with respect to ground potential changes with the grid frequency. Said grid-frequency potential change, in connection with construction-dictated stray capacitances at the solar modules, leads to stray currents, the amplitude of which can assume increased values, for example in the case of rain. PV systems have differential current sensors for reasons of operational safety. Since the stray current is superposed with the fault current of the system and contributes to a fault current value measured by the differential current sensors, an increased stray current can lead to premature tripping of protection mechanisms based on fault current measurements, as a result of which the PV system automatically switches off, even though safe operation would still be possible.

SUMMARY

The present disclosure is directed to demonstrate an operating method for a transformerless full-bridge inverter that counteracts an increase in the stray current. Accordingly, an inverter is disclosed that is less sensitive to the influence of a high stray capacitance when determining fault currents.

One aspect of the disclosure relates to a method for operating a transformerless full-bridge inverter comprising a first half-bridge and a second half-bridge, which are arranged in parallel with one another and with a link circuit between DC terminals of the inverter and the respective bridge output of which is connected by means of a filter inductor to an AC output of the inverter. The AC output is assigned to the corresponding half-bridge, wherein the AC outputs are connected to a grid, and wherein a network of filter capacitors, which network is coupled in a low-impedance manner to the link circuit, is arranged between the AC outputs. The method comprises operating the two half-bridges of the inverter using a unipolar first clocking method and determining a value of a grid-frequency stray current at the DC terminals of the inverter. When a limit value is exceeded by the stray current value, the two half-ridges of the inverter are operated using a stray-current-reducing second clocking method in which the first half-bridge provides an AC voltage at the AC output assigned thereto, wherein an amplitude of the AC voltage is less than 50% of the amplitude of a voltage amplitude of the grid and the second half-bridge provides a difference voltage between the grid voltage and the voltage provided by the first half-bridge at the AC output assigned thereto. The unipolar clocking method is operated over a period whose duration corresponds to the duration of a grid half-cycle in such a way that only one of the half-bridges is clocked.

The AC voltages provided by the half-bridges are, in one embodiment, each sinusoidal voltages, but any desired other voltage profiles in which the combination of the voltage profiles provided by the first half-bridge and the second half-bridge corresponds to the voltage profile of the grid voltage are also conceivable.

Advantageously, the amplitude of the AC voltage provided by the first half-bridge is selected depending on the stray current value. The amplitude of the AC voltage provided by the first half-bridge is, in one embodiment, selected to be lower, the higher the stray current value is. This produces a corresponding decrease in the amplitude of the potential fluctuation at the terminals of a generator connected to the inverter, with the result that an increase in the stray current value is counteracted or said increase is even avoided altogether. In one specific embodiment, the amplitude is controlled so that a maximum value of the stray current is not exceeded.

It is advantageous in one embodiment to connect the AC output assigned to the first half-bridge to a neutral conductor of the grid and to connect the AC output assigned to the second half-bridge to the phase conductor. This can be ensured, for example, by virtue of the fact that an installation instruction stipulates that one of the AC terminals is to be connected to the neutral conductor. As an alternative, the assignment can be checked once or regularly by virtue of the inverter measuring the voltages at the AC outputs with respect to ground and, on the basis of this measurement, determining which of the two AC outputs is connected to the neutral conductor of the grid. The assignment of the half-bridges present in the inverter as the first half-bridge and the second half-bridge can then be selected accordingly or an incorrect connection can be indicated. As an alternative, it is also conceivable, however, that the inverter determines whether a rise or a fall in the stray current value is achieved by changing from the first clocking method to the second clocking method and, in the event that the stray current value rises, exchanges the assignment of the half-bridges of the inverter as the first half-bridge and the second half-bridge.

In addition to changing the clocking method, when the limit value is exceeded by the stray current value, the inverter can furthermore increase a DC voltage applied to the DC terminals by actuating an input-side DC/DC converter. The DC/DC converter can in this case act as a boost converter or as a buck converter and, in particular, can keep the connected solar modules at the MPP (Maximum Power Point) despite a different DC voltage at the DC terminals. Owing to the increased DC voltage at the DC terminals, a higher partial voltage can be set using the second half-bridge so that the first half-bridge only has to set a lower component of the grid voltage and hence less stray current is produced.

In one embodiment of the method according to the disclosure, when the limit value is exceeded by the stray current value, one of the half-bridges is operated in a preset manner and the other of the half-bridges is operated in a controlled manner. In this case, the first half-bridge is operated in a preset manner. Preset operation can be realized, for example, by virtue of the fact that a prescribed clock pattern or a prescribed profile of the duty cycle is used to actuate the half-bridge without a voltage applied to the bridge output or a current flowing there being taken into account. In this case, the half-bridge operated in a controlled manner sets the desired grid current.

In one advantageous embodiment of the method, the first half-bridge and the second half-bridge are operated in sync with one another, that is to say at the same clock frequency or with a fixed time reference between switching times of the first and the second. Here, the switch-on times or the switch-off times or the midpoint of the switch-on duration of two switches of the two half-bridges can be selected as switching times, for example. However, it is likewise conceivable to operate the two half-bridges independently of one another and even at different clock frequencies.

Since operation of the inverter in the second clocking method leads to higher thermal loading of the switching elements and of the inductors, it is advantageous to limit a maximum inverter power to a lower value during operation using the second clocking method than using the first clocking method. Stronger limitation of the maximum inverter power in the second clocking method therefore prevents overloading of the inverter.

By taking the higher converter losses of the inverter in the second clocking method into account, it is advantageous, when the limit value is exceeded by the stray current value, to select an amplitude for the AC voltage provided by the first half-bridge of at most 30% of the amplitude of the grid voltage in order to achieve a reduction in the stray current value that offsets the higher converter losses of the inverter in the second clocking method. In particular, it is advantageous to change the amplitude of the AC voltage provided by the first half-bridge in stages. In this case, it is advantageous to provide at least two stages in the second clocking method. As an alternative, it is likewise conceivable to prescribe an amplitude for the AC voltage provided by the second half-bridge when the limit value is exceeded, in particular to select said amplitude to be as great as the applied DC voltage at the DC terminals allows, for example to select it to be half of said DC voltage or a value reduced slightly with respect thereto. When the DC voltage at the DC terminals changes, the amplitude of the AC voltage provided by the second half-bridge can also be adjusted continuously. The amplitude of the AC voltage provided by the first half-bridge is adjusted accordingly in order to provide the amplitude of the grid voltage in total.

In order to keep the period in which the inverter has to be operated using the less efficient second clocking method for limiting the stray current as short as possible, the inverter continuously or repeatedly determines the present stray current value during operation using the second clocking method and compares it with a further limit value, which is, in one embodiment, determined depending on the presently used amplitude value of the AC voltage provided by the first half-bridge. If the present stray current value undershoots said further limit value, this is a sign that it is possible to change back to the first clocking method without exceeding the limit value again. The inverter then changes back to the first clocking method either immediately or after a prescribed time in which the stray current value does not exceed the further limit again has elapsed. In particular, when the amplitude of the AC voltage provided by the respective half-bridges is selected depending on the DC voltage applied to the DC terminals, the further limit value can be determined as a function of said DC voltage.

In the event that the second clocking method controls to a fixed stray current value, there would be a return to the first clocking method when the amplitude of the AC voltage provided by the first half-bridge exceeds an amplitude limit value.

A further aspect of the disclosure relates to a transformerless inverter, which is configured for operation using the method described above or the embodiments thereof. In this case, the network of filter capacitors between the AC terminals can comprise a series circuit composed of two filter capacitors, the midpoint of which is connected to one of the DC terminals or to a midpoint of a link circuit designed as a split link circuit. Furthermore, the filter inductors of the inverter according to the disclosure are not magnetically coupled to one another.

The two half-bridges together form, possibly with additional components of the inverter bridge, in particular additional switches, a H4, a H5, a H6, a H6Q or a HERIC topology. In this case, during operation using the second, stray-current-reducing clocking method, the additional switches of the inverter bridge are permanently held in a switching state within a half-cycle so that the switches of the two half-bridges can provide the desired present voltage value through high-frequency clocking. In the H5 topology the additional switch S5 is permanently closed, in the HERIC topology the switches S5 and S6 are permanently open, and in the H6 topology the switches of the half-bridge halves having two series-connected switches and facing toward the DC terminals as seen from the bridge output are permanently closed.

In one embodiment, the inverter according to the disclosure can comprise just one current sensor to determine the AC output current, which current sensor is arranged, in particular, at the AC output assigned to the second half-bridge. If, during operation using the second clocking method, one of the half-bridges is operated in a preset manner and one of the half-bridges is operated in a controlled manner, the current sensor is arranged at the AC output assigned to the half-bridge operated in a controlled manner.

In addition to the inverter bridge comprising the first and the second half-bridge, an inverter according to the disclosure can further comprise a DC/DC converter, in particular a boost converter, the output of which is connected to the DC terminals. In this embodiment, the DC/DC converter can be used to provide a higher DC voltage at the DC terminals during operation using the second clocking method than during operation using the first clocking method.

In a further aspect, the operating method according to the application relates to a transformerless inverter, in which the inverter bridge is embodied in the H4 topology comprising a first half-bridge and a second half-bridge arranged in parallel with one another and with a link circuit between DC terminals of the inverter. The respective bridge output of the two half-bridges is connected by means of a filter inductor to an AC output of the inverter assigned to the corresponding half-bridge, wherein the AC outputs are connected to a grid. Here, a network of filter capacitors coupled in a low-impedance manner to the link circuit is arranged between the AC outputs. The method comprises operating the two half-bridges of the inverter using a first clocking method and determining a value of a grid-frequency stray current at the DC terminals of the inverter. When a limit value is exceeded by the stray current value, the two half-bridges of the inverter are operated using a stray-current-reducing second clocking method. In the first clocking method, the half-bridges are jointly operated using a bipolar clock pattern, as a result of which opposing voltage profiles with a respective amplitude of 50% of the grid voltage amplitude are provided at the two AC outputs. In the stray-current-reducing clocking method, the first half-bridge provides an AC voltage at the AC output assigned thereto of less than 50% of a voltage amplitude of the grid, or less than 30% of the grid voltage amplitude, and the second half-bridge provides a difference voltage between the grid voltage and the voltage provided by the first half-bridge at the AC output assigned thereto. In the first clocking method, this produces a fluctuation of the voltage of the DC terminals with respect to ground potential of 50% of the grid voltage amplitude and, in the second clocking method, a fluctuation reduced in comparison therewith and, as a result, a reduced value of the grid-frequency component of the stray current. The amplitude of the voltage provided by the first half-bridge is, in one embodiment, selected depending on the level of the stray current, in particular is selected so that the grid-frequency component of the stray current remains below a prescribed critical value.

Said amplitude is, in one embodiment, changed in stages when corresponding limit values of the grid-frequency component of the stray current are exceeded or undershot. The amplitude is in this case lowered when corresponding limit values are exceeded and increased when they are undershot.

Said alternative operating method according to the application can be used, in particular, in connection with semiconductor switches, for example made of gallium nitride, that switch more rapidly compared to silicon switches, as a result of which the switching and magnetizing losses during the second clocking method are not or are not significantly increased compared to the first clocking method.

BRIEF DESCRIPTION OF THE DRAWINGS

The disclosure and some of the design variants thereof are explained in more detail in the following text with the aid of figures, wherein.

DETAILED DESCRIPTION

Figure 1:
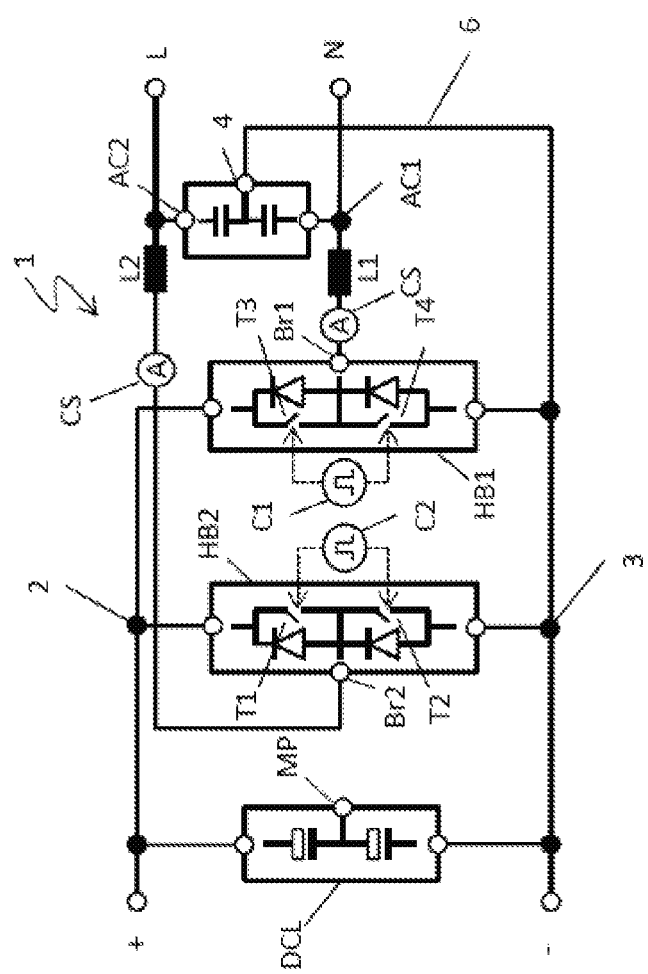
FIG. 1 shows a schematic design of an inverter according to the disclosure in the H4 topology.

The inverter 1 shown in FIG. 1 has DC terminals 2, 3 to which a voltage source (not shown), in particular a PV generator, can be connected. A link circuit DCL is arranged between the DC terminals 2, 3, and a first half-bridge HB1 and a second half-bridge HB2 are arranged in parallel with the link circuit DCL. The first half-bridge HB1 can be formed from two series-connected semiconductor switches T3, T4. The midpoint of the semiconductor switches is led out of the first half-bridge HB1 as a first bridge output Br1. Analogously, the second half-bridge HB2 can be formed from two series-connected semiconductor switches T1, T2, the midpoint of which is led out of the second half-bridge HB2 as a second bridge output Br2. The semiconductor switches can have an intrinsic or a separate antiparallel freewheeling diode.

A first filter inductor L1 connects the first bridge output Br1 to a first AC output AC1, a second filter inductor L2 connects the second bridge output Br2 to a second AC output AC2. A network 4 of filter capacitors, which, together with the filter inductors L1, L2, form an AC grid filter, is arranged between the two AC outputs AC1, AC2. The network 4 is formed here by way of a series circuit composed of two filter capacitors, the midpoint of which is connected to the DC terminal 3 by means of a low-impedance connection 6. The low-impedance connection 6 is in this case a direct connection, wherein it is likewise conceivable to provide in the connection further component parts having a low impedance at the grid frequency and at the switching frequency of the bridges. As an alternative to the DC terminal 3, the midpoint of the network 4 can likewise be connected to the DC terminal 2 or the midpoint MP of a link circuit DCL, which is split in this case, so that the respective potentials are coupled to one another. The first AC output AC1 can be connected to a neutral conductor N of a grid and the second AC output AC2 is connected to a phase conductor L of said grid. It is conceivable that the grid filter has further filter components, in particular further filter inductors between the network 4 and the connected grid.

The two half-bridges HB1, HB2 are actuated by way of controllers C1, C2 assigned thereto. The controller C1 switches on the switches T3, T4 of the first half-bridge HB1 by means of pulse-width modulation, the controller C2 switches on the switches T1, T2 of the second half-bridge HB2. The current provided by the half-bridges is detected by current sensors CS arranged at the bridge outputs Br1, Br2. In this embodiment, a value of the stray current can be determined by determining the difference between the measurement values of the two current sensors CS. In this case, the grid-frequency stray current is the frequency component of the difference at the frequency of the connected grid. As an alternative, the grid-frequency stray current can also be determined by way of further sensors on the AC side or the DC side of the inverter 1 in a manner already known.

Figure 2:
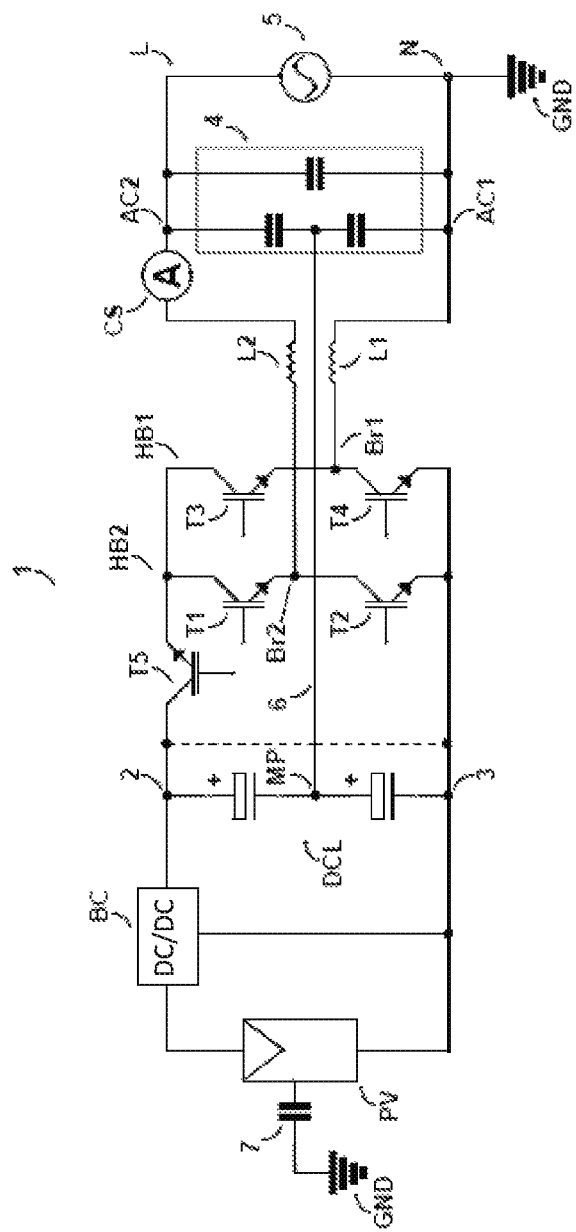
FIG. 2 shows a further embodiment of an inverter according to the disclosure in the H5 topology.

FIG. 2 shows a further embodiment of an inverter 1 according to the disclosure. In this case, a PV generator PV is connected to the DC terminals 2, 3 by means of a DC/DC converter BC, for example a boost converter. In the other inverter topologies as well, such a DC/DC converter BC can be provided on the input side in order to convert the voltage of the PV generator PV to the voltage of the link circuit DCL. A stray capacitance 7 is furthermore shown symbolically as a cause of a stray current, which stray capacitance connects the PV generator PV to ground GND. The inverter bridge is designed in this case as what is known as a H5 bridge, which, in addition to the transistors T1 to T4 of the two half-bridges HB1, HB2, also comprises a further transistor T5, which connects the upper connection point of the half-bridges HB1, HB2 to the DC terminal 2. The link circuit DCL is in this case likewise embodied as a split link circuit with a midpoint MP. The network 4 of the AC filter is provided on the output side with, in addition to a series circuit of two filter capacitors between the terminals L, N to which the grid 5 is connected, a further capacitor as well, which further capacitor is arranged directly between the two grid terminals L, N. The midpoint of the series circuit composed of the filter capacitors of the network 4 is in this case connected directly to the midpoint MP of the link circuit DCL. In the embodiment shown here, only one single current sensor CS is provided in the connection lines to the grid 5, which is also likewise possible in the other conceivable embodiments.

The additional transistor T5 in the H5 topology serves to electrically isolate the connected PV generator PV from the connected grid 5 during the freewheeling phases. In the context of this disclosure, said transistor performs this function but only during operation using the first, unipolar clocking method. During operation using the second clocking method, T5 remains permanently switched on and hence makes it possible to independently operate the two half-bridges HB1, HB2 at the link circuit DCL.

Figure 3:
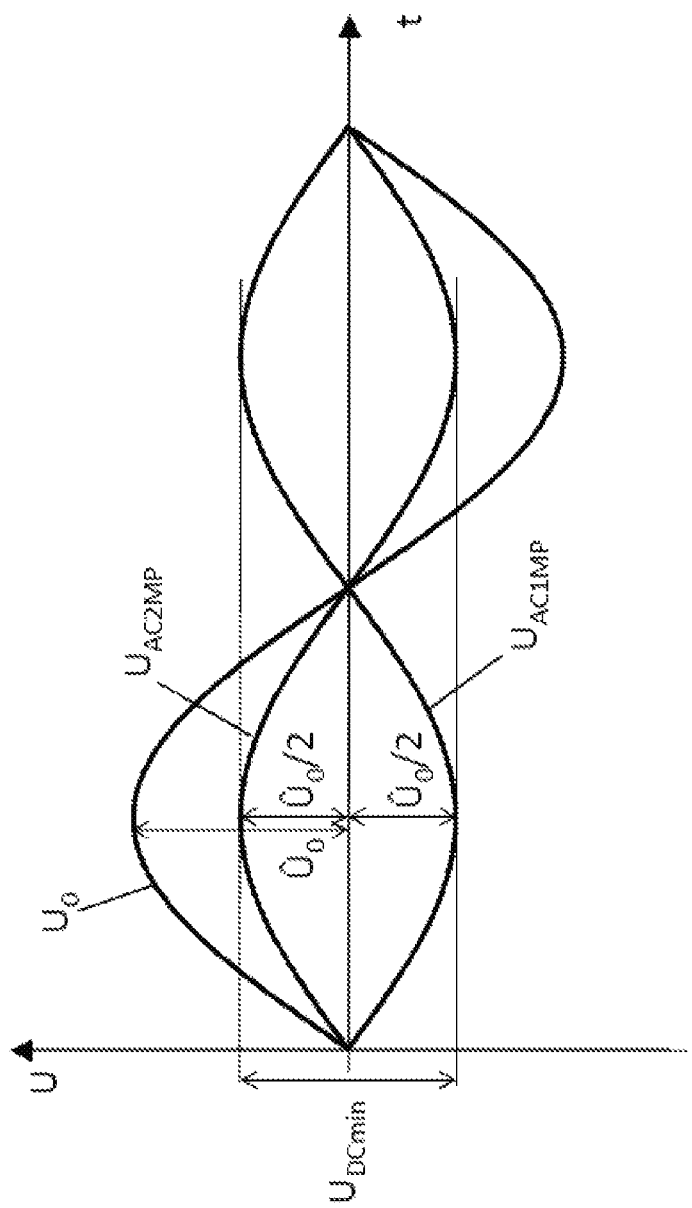
FIG. 3 shows a time profile of voltages during operation of the inverter according to the disclosure in a unipolar first clocking method.

To explain the functioning of the disclosure in more detail, FIG. 3 first of all shows a temporal profile of voltages, as arises, for example, from the H5 topology from FIG. 2, when it is operated in the first clocking method. The grid voltage $U_0$ has the known sinusoidal profile with an amplitude $\hat{U}_0$. In the unipolar clocking method, during one half-cycle of the grid voltage, only one of the two half-bridges HB1, HB2 is clocked. In connection with the potential-free freewheeling, which arises in a manner dependent on the topology by way of the clocking of further switches, the half-bridges generate at the AC terminals AC1, AC2 mutually opposing sinusoidal profiles $U_{AC1MP}$, $U_{AC2MP}$ with half the grid amplitude $\hat{U}_0/2$ based on the potential of the link circuit midpoint MP. Said two sinusoidal profiles are added together to form the profile of the grid voltage $U_0$. Since the AC terminal AC1 is fixedly connected to the N conductor of the grid 5, the potential of the link circuit midpoint MP varies with respect to ground potential, which is assumed here as equal to the potential of the N conductor for simplification, likewise sinusoidally with an amplitude corresponding to half the grid amplitude $U_0/2$. This leads to a grid-frequency component of a stray current across the stray capacitance 7 that is proportional to the amplitude of the variation of the generator potential. Said component is added to a fault current flowing on account of a non-ideal isolation of the PV generator PV and can lead, in particular in the case of a high value of the stray capacitance 7, to tripping of an isolation monitoring circuit, even though the system is still in a sufficiently isolated state. In order to reduce the grid-frequency component of the stray current, it is therefore desirable to reduce the grid-frequency amplitude of the variation of the generator potential in order to likewise reduce the corresponding grid-frequency component of the stray current.

Figure 4:
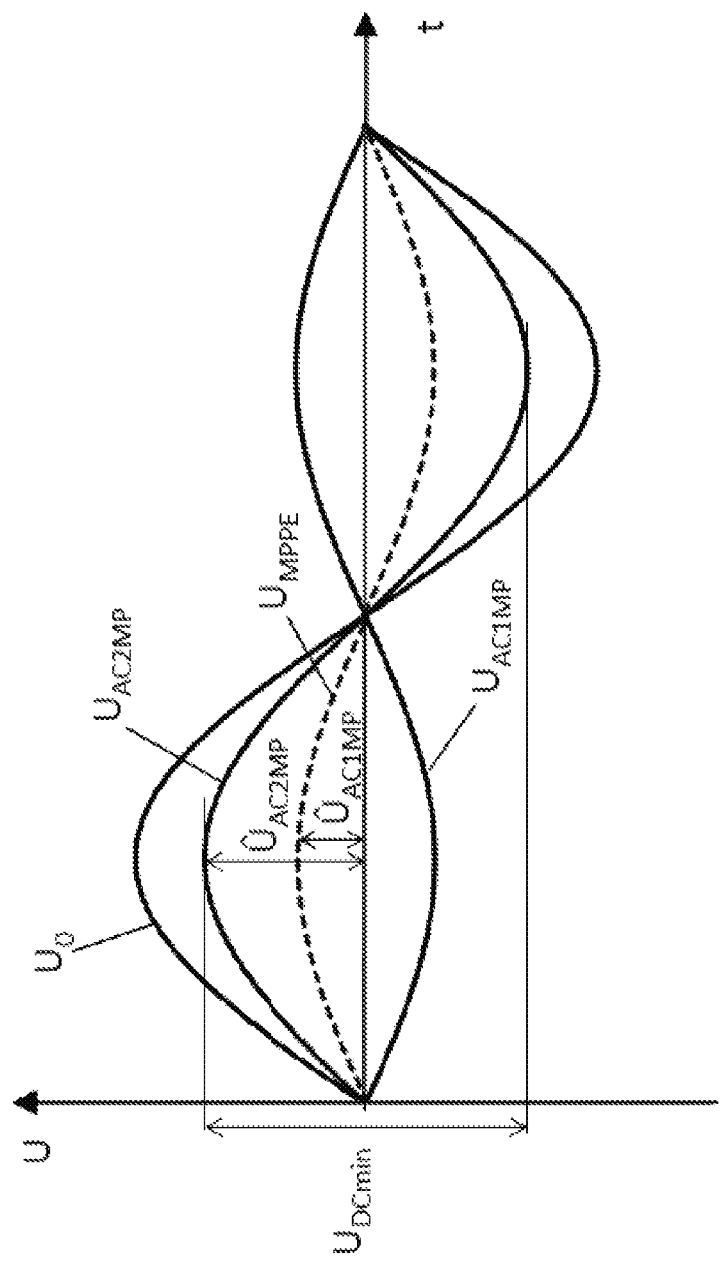
FIG. 4 shows a time profile of voltages during operation of the inverter according to the disclosure in a stray-current-reducing second clocking method.

Here, the second clocking method according to the present disclosure becomes important, which method is able to reduce said amplitude of the variation of the generator profile to a lower value than half the grid amplitude $\hat{U}_0/2$. The functioning of said second clocking method is illustrated and explained with the aid of the voltage profiles shown in FIG. 4.

To this end, FIG. 4 again shows the sinusoidal profile of the grid voltage $U_0$ in comparison with the voltage profiles $U_{AC1MP}$, $U_{AC2MP}$ at the respective AC terminals AC1, AC2 with respect to the potential of the link circuit midpoint MP. The amplitude $\hat{U}_{AC1MP}$ of the voltage profile at the AC terminal AC1 is in this case lower than the amplitude $\hat{U}_{AC2MP}$ of the voltage profile at the AC terminal AC2. The amplitude $\hat{U}_{AC1MP}$ is advantageously at most 30% of the grid voltage amplitude $\hat{U}_0$. Correspondingly, the amplitude $\hat{U}_{AC2MP}$ is at least 70% of the grid voltage amplitude $\hat{U}_0$. Since, as described already, the AC terminal AC1 is connected to the neutral conductor of the grid 5, the voltage profile of the link circuit midpoint MP varies only with the smaller amplitude $\hat{U}AC1MP$ and is accordingly reduced with respect to the amplitude resulting from the first clocking method described above. Analogously, the grid-frequency component of the stray current is also reduced by the second clocking method.

In order to achieve the asymmetrical voltage profiles at the AC terminals AC1, AC2, the respective half-bridges HB1, HB2 are controlled independently of one another to the voltage profiles of corresponding target values of the bridge voltage. As an alternative to voltage regulation in the half-bridges HB1, HB2, it is also possible for just one half-bridge, for example, the first half-bridge HB1, to be operated in a voltage-controlled manner, whereas the second half-bridge is operated in a current-controlled manner, so that a desired grid current is produced. The voltage regulation can be carried out by determining the deviation of a measured voltage at the respective AC terminals AC1, AC2 from the prescribed target values and a change in the respective duty cycle that can be used to operate the half-bridges HB1, HB2, which change corresponds to the deviation. However, it is also conceivable to operate one of the two half-bridges, for example, the first half-bridge HB1, using a predefined clock pattern, which leads at least approximately to a voltage profile at the AC terminal AC1 that has the desired amplitude $\hat{U}_{AC1MP}$. In this case, it is only necessary to operate one of the two half-bridges in a controlled manner.

The first half-bridge HB1 can be operated independently of the second half-bridge HB2, that is to say, in particular, even at a deviating frequency. In this case, there is no temporal correlation between the switching times of the bridge switches of the two half-bridges. However, it is likewise easily possible to operate the two half-bridges at the same clock frequency and, in particular, in sync with one another, for example by virtue of the midpoints of the switch-on periods of the first and the second half-bridge being synchronized.

In order to provide the asymmetrical voltage profiles at the AC terminals AC1 and AC2, the two half-bridges have to be clocked permanently, that is to say both switches of the half-bridges are alternately closed during both half-cycles so that both the positive and the negative voltage of the DC terminals 2, 3 is provided in phases at the bridge output of said half-bridges. This is the cause for the increased converter losses described above during operation using the second clocking method in comparison with operation using the first clocking method.

The minimum voltage $U_{DCmin}$ of the generator required in the second, stray-current-reducing clocking method is determined by the amplitude $\hat{U}_{AC2MP}$ at the second AC terminal AC2 and is twice this value. Said value is higher than the required minimum voltage $U_{DCmin}$ of the generator when the inverter 1 is operated using the first clocking method ($U_{DCmin}=\hat{U}_0$, see FIG. 3). It is therefore advantageous or even necessary to increase the generator voltage when a change is made from the first to the second clocking method in order to prevent undershooting of said minimum voltage. The generator voltage can be adjusted by way of a DC/DC converter BC connected upstream of the inverter.

The invention claimed is:

1. A method for operating a transformerless inverter comprising a first half-bridge and a second half-bridge arranged in parallel with one another and with a link circuit between first and second DC terminals of the inverter, wherein each of the first half-bridge and the second half-bridge have an output of which is connected by means of a respective filter inductor to first and second AC outputs of the inverter, respectively, such that each AC output is assigned to the corresponding half-bridge, wherein the first and second AC outputs are connected to a grid, and wherein a network of filter capacitors coupled in a low-impedance manner to the link circuit is arranged between the first and second AC outputs, comprising:

operating the first and second half-bridges of the inverter using a unipolar clocking method as a first clocking method, determining a value of a grid-frequency stray current at the DC terminals of the inverter during the unipolar clocking method, and when a limit value is exceeded by the stray current value, operating the first and second half-bridges of the inverter using a stray-current-reducing clocking method as a second clocking method in which the first half-bridge provides an AC voltage at the first AC output, wherein an amplitude of the AC voltage is less than 50% of the amplitude of a voltage amplitude of the grid, and the second half-bridge provides a difference voltage between the grid voltage and the voltage provided by the first half-bridge at the first AC output.

2. The method as claimed in claim 1, wherein the AC voltages provided by the first and second half-bridges are each sinusoidal voltages.

3. The method as claimed in claim 1, wherein the amplitude of the AC voltage provided by the first half-bridge in the stray-current-reducing clocking method is selected depending on the stray current value, wherein the amplitude is selected to be lower given a higher stray current value.

4. The method as claimed in claim 1, wherein the amplitude of the AC voltage provided by the second half-bridge is selected depending on a voltage applied to the DC terminals.

5. The method as claimed in claim 1, wherein the AC output assigned to the first half-bridge is connected to a neutral conductor of the grid.

6. The method as claimed in claim 1, wherein, when the limit value is exceeded by the stray current value, a DC voltage applied to the DC terminals is further increased by actuating an input-side DC/DC converter of the inverter.

7. The method as claimed in claim 1, wherein, when the limit value is exceeded by the stray current value, one of the first and second half-bridges is operated in a preset manner and the other of the first and second half-bridges is operated in a controlled manner.

8. The method as claimed in claim 1, wherein the first half-bridge and the second half-bridge are operated in sync with one another.

9. The method as claimed in claim 1, wherein the first half-bridge and the second half-bridge are operated independently of one another, in particular at different clock frequencies.

10. The method as claimed in claim 1, wherein a maximum inverter power of the inverter is limited to a higher value during operation using the first clocking method than using the second clocking method.

11. A transformerless inverter comprising a first half-bridge and a second half-bridge arranged in parallel with one another and with a link circuit between first and second DC terminals of the inverter, wherein each of the first half-bridge and the second half-bridge have an output which is connected by means of a respective filter inductor to first and second AC outputs of the inverter, such that each AC output is assigned to the corresponding half-bridge, wherein the first and second AC outputs are connected to a grid, and wherein a network of filter capacitors coupled in a low-impedance manner to the link circuit is arranged between the AC outputs, configured for operation using a method, comprising:

operating the first and second half-bridges of the inverter using a unipolar clocking method as a first clocking method, determining a value of a grid-frequency stray current at the DC terminals of the inverter during the unipolar clocking method, and when a limit value is exceeded by the stray current value, operating the first and second half-bridges of the inverter using a stray-current-reducing clocking method as a second clocking method in which the first half-bridge provides an AC voltage at the first AC output, wherein an amplitude of the AC voltage is less than 50% of the amplitude of a voltage amplitude of the grid, and the second half-bridge provides a difference voltage between the grid voltage and the voltage provided by the first half-bridge at the first AC output.

12. The inverter as claimed in claim 11, wherein the network comprises a series circuit composed of two filter capacitors, the midpoint of which is connected to one of the first and second DC terminals or to a midpoint of a link circuit designed as a split link circuit.

13. The inverter as claimed in claim 11, wherein the filter inductors of the AC outputs are not magnetically coupled.

14. The inverter as claimed in claim 11, wherein the first and second half-bridges are coupled with additional circuitry to collectively comprise a bridge topology comprising one of the bridge topologies: H4, H5, H6, H6Q and HERIC.

15. The inverter as claimed in claim 11, wherein just one current sensor (CS) is provided to determine the AC output current, which current sensor is arranged at the second AC output assigned to the second half-bridge.

16. The inverter as claimed in claim 11, further comprising a DC/DC converter connected to the first and second DC terminals.

* * * * *